United States Patent
Zou et al.

[11] Patent Number: 6,063,470
[45] Date of Patent: May 16, 2000

[54] SUBSTRATE FOR INFORMATION RECORDING MEDIA AND MAGNETIC DISC

[75] Inventors: Xuelu Zou; Hisayoshi Toratani, both of Tokyo, Japan

[73] Assignee: Hoya Corporation, Tokyo, Japan

[21] Appl. No.: 08/923,142

[22] Filed: Sep. 4, 1997

[30]    Foreign Application Priority Data

Sep. 4, 1996  [JP]  Japan .................................... 8-233935

[51] Int. Cl.$^7$ ...................................................... G11B 5/82
[52] U.S. Cl. ...................... 428/64.2; 428/426; 428/432; 428/694 ST; 428/900; 427/129; 427/130
[58] Field of Search .................... 428/64.2, 426, 428/432, 694 ST, 900; 501/64, 69, 70; 427/129, 130

[56]                References Cited

U.S. PATENT DOCUMENTS

| | | | |
|---|---|---|---|
| 4,820,660 | 4/1989 | Mohri et al. ................................. | 501/8 |
| 5,391,522 | 2/1995 | Goto et al. .................................. | 501/4 |
| 5,599,754 | 2/1997 | Maeda et al. ............................... | 501/20 |
| 5,780,371 | 7/1998 | Rifqi et al. ................................. | 501/67 |

FOREIGN PATENT DOCUMENTS

| | | |
|---|---|---|
| 634374 | 1/1995 | European Pat. Off. . |
| 239036 | 9/1989 | Japan . |
| 273525 | 12/1991 | Japan . |
| 187711 | 7/1995 | Japan . |
| 169724 | 7/1996 | Japan . |
| 2179486 | 3/1987 | United Kingdom . |

*Primary Examiner*—Stevan A. Resan
*Attorney, Agent, or Firm*—Burns, Doane, Swecker & Mathis, L.L.P.

[57]                ABSTRACT

A material according to the invention is made of a glass whose transition temperature is 750 degrees Celsius or greater and used for a substrate for information recording media, and for example, the glass has an essential component made of any group chosen from $SiO_2$—$Al_2O_3$—$MgO$—$CaO$, $SiO_2$—$Al_2O_3$—$MgO$—$Y_2O_3$, $SiO_2$—$Al_2O_3$—$CaO$—$Y_2O_3$, $SiO_2$—$Al_2O_3$—$MgO$—$CaO$—$Y_2O_3$, and $SiO_2$—$Al_2O_3$—$M_2O_3$ (wherein M denotes a trivalent metal.). This material can form a substrate for information recording media, or more specifically, a substrate on which at least a magnetic layer is formed to constitute a magnetic disc. A manufacturing method for magnetic disc according to the invention includes a process to improve a coercive force of a magnetic layer by thermally treating the magnetic layer at a temperature at least 40 degrees Celsius below the transition temperature of the material forming the substrate for the magnetic disc, where at least the magnetic layer is formed on the substrate made of the above material. The material is suitable for a substrate for information recording media made of the glass having an excellent surface flatness and mechanical strength and property durable against a heat treatment implemented at a high temperature for improving magnetic characteristics of the magnetic layer. This material is applicable to a substrate, a magnetic recording media in use of the substrate, and a manufacturing method for such information recording media.

11 Claims, 1 Drawing Sheet

6,063,470

SUBSTRATE FOR INFORMATION RECORDING MEDIA AND MAGNETIC DISC

BACKGROUND OF THE INVENTION

1. Field of the Invention

This invention relates to a glass material suitable for a substrate for information recording media such as magnetic discs, optical discs, and the like. More particularly, this invention relates to a substrate material for information recording media such as magnetic recording medium discs made of a glass material having excellent flatness and strength, as well as high heat resistance, and being durable against a higher heat treatment in order for a coercive force improvement of a magnetic layer, a substrate using this material, an information recording medium using this substrate, and a manufacturing method for such information recording media.

2. Description of Related Art

As a glass substrate for, e.g., a magnetic disc (hard disc), a substrate made of a chemically tempered glass whose substrate surface is reinforced by an ion exchange and a crystallized glass substrate whose substrate surface is subject to a crystallization treatment, have been known previously.

For example, as a chemically tempered glass substrate, Japanese Unexamined Patent Publication No. Hei 1-239,036 (hereinafter referred to as Reference 1) discloses a glass substrate for magnetic recording media in which glass containing, by weight percent, $SiO_2$ of 60 to 70 percent, $Al_2O_3$ of 0.5 to 14 percent, $R_2O$ (R denotes alkali metal) of 10 to 32 percent, ZnO of 1 to 15 percent, and $B_2O_3$ of 1.1 to 14 percent, is reinforced by an ion exchange.

As a crystallized glass, Japanese Unexamined Patent Publication No. Hei 7-187,711 (hereinafter referred to as Reference 2) discloses a glass substrate for magnetic recording media including kanasite as a main crystal and, by weight percent, $SiO_2$ of 50 to 65 percent, CaO of 18 to 25 percent, $Na_2O$ of 6 to 11 percent, $K_2O$ of 6 to 12 percent, $Al_2O_3$ of 0 to 2.5 percent, and F of 5 to 9 percent.

Moreover, Japanese Unexamined Patent Publication No. Hei 8-169,724 (hereinafter referred to as Reference 3) discloses, as a $SiO_2$—$Al_2O_3$—RO (R denotes bivalent metal) system glass, a high expansion, heat-resisting glass used for magnetic discs or the like having a transition temperature (Tg) of 650 degrees Celsius or greater and a thermal expansion coefficient ($\alpha$) of a range of 80 to $110 \times 10^{-7}/°C$. which contains, by weight percent of total amounts of inevitable components, $SiO_2+Al_2O_3$ of 35 to 55 percent, and CaO+BaO of 40 to 60 percent.

Meanwhile, magnetic recording media have been made year after year with higher and higher recording densities, and therefore, there are various demands for properties of glass substrates for magnetic recording media. One of such demands is high heat resistance. Magnetic characteristics of a magnetic layer (magnetic recording layer) such as coercive force have to be improved to increase the recording density of the magnetic recording media. The coercive force of the magnetic layer, though may vary on magnetic materials to be used, can be made higher by a heat treatment even if made of the same materials. Therefore, in addition to developments for new magnetic materials, it has been expected to thermally treat a magnetic layer formed on a substrate at a higher temperature for the purpose of obtaining higher coercive force using currently existing materials.

The conventional chemically tempered glass as disclosed in Reference 1, however, has a glass transition temperature around 500 degrees Celsius. To the contrary, to improve the magnetic characteristics such as coercive force of the magnetic layer, the heat treatment is effective when implemented at a temperature higher than 500 degrees Celsius. Accordingly, the chemically tempered glass as described in Reference 1 itself does not have enough heat resistance. Such chemically tempered glasses generally have an ion exchange layer for alkali metal ions on the surface of the glasses. When a magnetic layer is formed on the surface of the chemically tempered glass and subject to a heat treatment, however, there arises a problem that the ions in the ion exchange layer immigrate in the magnetic layer and affect the magnetic layer unfavorably. A higher temperature will further activate the immigrations of the alkali metal ions into the magnetic layer. To suppress such alkali ion's immigrations, it is favorable to perform a heat treatment at a further lower temperature. Thus, magnetic characteristics may rarely be improved where the chemically tempered glass substrate is used and subject to a heat treatment at a high temperature, and it is difficult to obtain magnetic recording media having a high coercive force.

Another conventional crystallized glass as disclosed in Reference 2 has an excellent heat resistance because the glass does not show transition. However, the glass substrate for magnetic recording media requires more surface smoothness as the recording density increases. This is because high density recording in the magnetic recording media requires a lower frying of the magnetic head. Since the crystallized glass contains many micro-particles, it is impossible to form substrates with a surface roughness (Ra) of 10 angstroms or less. Consequently, the substrates likely have poor surface flatness and impaired surface form. A roughness control layer, for example, may be formed on a substrate to prevent the magnetic head from clinging to the magnetic disc. However, there arises a problem that on the substrate made of the crystallized glass, it is difficult to control surface morphology of the roughness control layer.

The glass described in Reference 3 has a transition temperature of at most 730 degrees Celsius. Glass substrates generally require a treatment implemented at a temperature of about 40 or more degree Celsius below the transition temperature, to be subject to the heat treatment without deformation of the glass substrates. A glass having a transition temperature of 730 degrees Celsius should has to endure a heat treatment implemented at most at 680 degrees Celsius. However, a next generation magnetic recording media require to meet further stricter demands for magnetic characteristics, and as a result, the media needs a heat treatment implemented at a further higher temperature, e.g., a temperature exceeding 700 degrees Celsius. The glass disclosed in Reference 3 cannot endure such a high heat treatment.

A carbon substrate for magnetic recording media has been known as having good heat resistance, as disclosed in, e.g., Japanese Unexamined Patent Publication No. Hei 3-273, 525. The carbon substrate, however, has a mechanical strength inferior to glass and may hardly correspond to a thinner substrate trend that is demanded as magnetic discs are made smaller.

This invention is devised in consideration to the above problems. It is a first object of the invention to provide a material suitable for a substrate for information recording media made of glass having excellent surface flatness and mechanical strength, the material having excellent characteristics durable against a heat treatment at a higher temperature for improving magnetic characteristics of a magnetic layer, and to provide a substrate using this material.

It is a second object of the invention to provide a magnetic recording medium capable of lowering a frying height of a magnetic head, increasing recording density, making thinner, or more compact, the substrate, and improving the magnetic characteristics in the best fashion, and to provide a manufacturing method for the magnetic recording medium.

SUMMARY OF THE INVENTION

In order to accomplish the foregoing objects, this invention has the following constitution. In one form of the invention, a material is made of a glass having a glass transition temperature of 750 degrees Celsius or greater and used for a substrate for information recording media. According to one embodiment of the invention, this material has an essential composition made of any group of $SiO_2$—$Al_2O_3$—$MgO$—$CaO$, $SiO_2$—$Al_2O_3$—$MgO$—$Y_2O_3$, $SiO_2$—$Al_2O_3$—$CaO$—$Y_2O_3$, $SiO_2$—$Al_2O_3$—$MgO$—$CaO$—$Y_2O_3$, and $SiO_2$—$Al_2O_3$—$M_2O_3$ (M denotes trivalent metal.).

In another aspect of the invention, a substrate for information recording media is made of the above material. The substrate for information recording media has a high surface smoothness. In one embodiment, the information recording medium may be a magnetic disc and which may have at least a magnetic layer on the above substrate. Coercive force of the magnetic layer may be strengthened by a heat treatment.

To manufacture the magnetic disc, a magnetic layer is formed on the substrate made of the above material; the substrate is then thermally treated at a temperature at least 40 degrees Celsius below the transition temperature of the above material to strengthen the coercive force of the magnetic layer.

DESCRIPTION OF PREFERRED EMBODIMENTS

Figure 1:
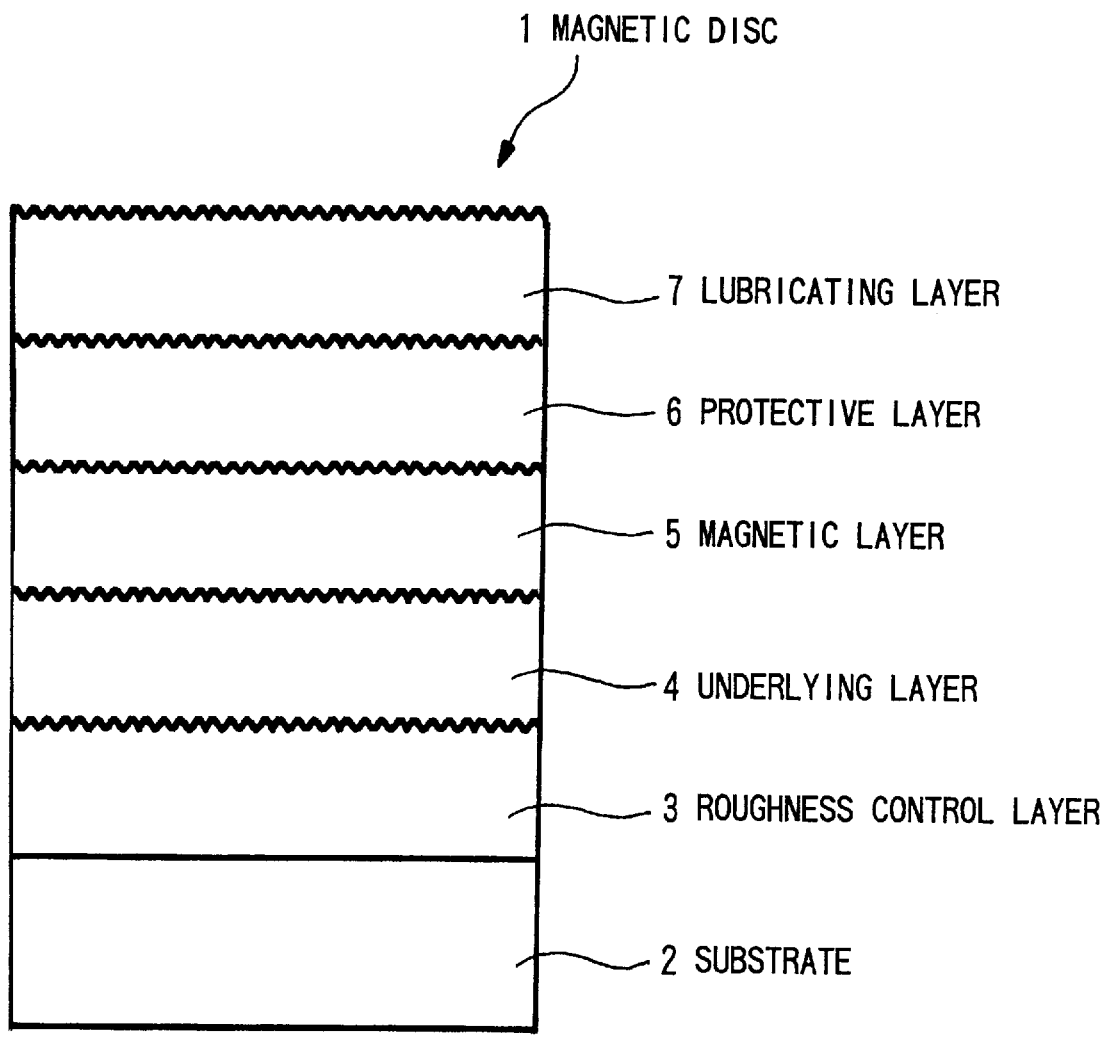
FIG. 1 is a cross-sectional illustration showing a magnetic disc 1 according to the invention in which a roughness control layer 3, a underlying layer 4, a magnetic layer 5, a protective layer 6, and a lubricating layer 7 are formed in this order on a glass substrate.

A material according to the invention is made of a glass having a transition temperature of 750 degrees Celsius or greater and used for a substrate for information recording medium. Since the material has the transition temperature of 750 degrees Celsius or greater, the material can advantageously receive a heat treatment of about 700 degrees Celsius or greater. A glass having a transition temperature of 750 degrees or greater can be chosen from glasses whose essential components are, e.g., $SiO_2$—$Al_2O_3$—$MgO$—$CaO$, $SiO_2$—$Al_2O_3$—$MgO$—$Y_2O_3$, $SiO_2$—$Al_2O_3$—$CaO$—$Y_2O_3$, $SiO_2$—$Al_2O_3$—$MgO$—$CaO$—$Y_2O_3$, and $SiO_2$—$Al_2O_3$—$M_2O_3$ (M denotes trivalent metal.). As an M (trivalent metal) in the $SiO_2$—$Al_2O_3$—$M_2O_3$ system glass can be chosen from, e.g., Y, Nd, Gd, Ho, La, Ce, Yb, etc. Any of those glasses has a high transition temperature and, because of not a crystallized glass, a high surface smoothness. The material according to the invention is a glass preferably having a transition temperature of 800 degrees Celsius or greater. It is practical for a glass of multiple components to have a transition temperature of 1,000 degrees Celsius or less.

As a component or components optionally added to the essential components, exemplified are $TiO_2$, $ZrO_2$, $Li_2O$, $As_2O_3$, $Sb_2O_3$, ZnO, SrO, NiO, CoO, $Fe_2O_3$, CuO, $Cr_2O_3$, $B_2O_3$, $P_2O_5$, $V_2O_5$, etc. $TiO_2$ lowers a viscosity of the glass at a high temperature and improves melting characteristics. $TiO_2$ contributes to increase structural stability and durability of the glass, but works for decreasing the transition temperature, and therefore it is desirable to use a small amount, e.g., 10 molar percent or less, when adding $TiO_2$. $ZrO_2$ has a function to improve crystal stability and heat resistance of the glass. $LiO_2$ mainly has a function to increase meltability of the glass, and it is desirable to use a small amount, e.g., 12 molar percent or less, when adding $LiO_2$, because such an alkali component lowers the transition temperature. A chemically tempering process by means of ion exchange can be used when $LiO_2$ is added to strengthen the glass. In the case of alkali-free glass not containing $LiO_2$, an alkali component may not be diffused in a thin film on the substrate where the thin film is formed on the glass substrate, thereby preventing impairments from occurring. A small amount, e.g., 3 molar percent or less, of $As_2O_3$ and $Sb_2O_3$ may be added as a degassing agent to unify the quality of the glass. One or more of ZnO, SrO, NiO, CoO, $Fe_2O_3$, CuO, $Cr_2O_3$, $B_2O_3$, $P_2O_5$, $V_2O_5$, etc., may be added to control the high temperature melting characteristics and physical property of the glass. In the case that a coloring agent or agents such as $V_2O_5$, $Cr_2O_3$, CuO, CoO of a small amount are added to the glass, the glass may obtain an infrared absorption characteristics, thereby effectuating the heat treatment for the magnetic layer by radiation of a heating lamp.

The substrate for information recording media according to the invention is characterized in made of the above glass material of the invention. As an information recording medium, for example, a magnetic recording medium is exemplified, and as a magnetic recording medium, for example, a magnetic disc such as a hard disc or the like is exemplified. The size and shape of the substrate can be determined according to usage. The substrate of the present invention is characterized in that the substrate has high surface. In this specification, high surface smoothness means, more specifically, a surface roughness (Ra) of 5 angstroms or less. A higher surface smoothness, when the substrate is for a magnetic disc, reduces a space between the magnetic head and the magnetic disc and advantageously increases the recording density.

The manufacturing method for the glass material and the substrate according to the invention is not limited to a specific method, and known methods for manufacturing various glasses and substrates can be used as they are. For example, a substrate of desirable size and shape can be formed by melting raw glass materials of a prescribed proportion in air or atmosphere of inert gas as a high temperature melting method, unifying the quality of the glass by bubbling, adding degassing agents to, and stirring the molten materials, forming the materials into a plate glass by a method such as a known pressing method, download molding, or the like, and then, treating the plate glass with grinding, polishing, or the like. During polishing, the surface roughness (Ra) can be controlled in a range of, e.g., 3 to 5 angstroms by lapping and polishing with abrasives such as cerium oxides or the like.

This invention also includes a magnetic disc formed at least with a magnetic layer on a major surface of the invented substrate. As a magnetic disc, a hard disc is exemplified. According to the invention, a magnetic disc is formed directly or indirectly with a magnetic layer on the invented substrate, while coercive force of the magnetic layer is increased by a heat treatment. This heat treatment is done at a temperature of, e.g., 500 degrees Celsius or greater, preferably 600 degrees Celsius or greater, more preferably 700 degrees Celsius or greater, and much more preferably, 800 degrees Celsius or greater, and done at a temperature 40 degrees Celsius or greater below, and preferably 60 degrees Celsius or greater below the transition temperature of the material As for layers other than the magnetic layer, various known layers may be optionally formed as required. From a viewpoint of functions, an underlying layer, a protective layer, a lubricating layer, a roughness control layer, and the like are exemplified as such other layers. Various thin film forming technologies are used to form those layers.

Materials for forming the magnetic layer are not particularly limited. As a magnetic layer, for example, a Co system, as well as a ferrite system, iron-rare earth system, and the like are exemplified. The magnetic layer can be for either horizontal or vertical magnetic recording. As a magnetic layer, more specifically, exemplified are, e.g., magnetic thin films containing Co as a main component such as CoPt, CoCr, CoNi, CoNiCr, CoCrTa, CoPtCr, CoNiCrPt, CoNiCrTa, CoCrPtTa, CoCrPtSiO. The magnetic layer can has a multilayer configuration formed by separating magnetic layers with non-magnetic layers in order to reduce noises.

The underlying layer for the magnetic layer is selected according to the magnetic layer. As an underlying layer, exemplified are one or more materials chosen from non-magnetic metals such as Cr, Mo, Ta, Ti, W, V, B, and Al, and oxides, nitrides, carbides, and the like of those metals. For a magnetic layer having Co as a main component, it is preferable to form a pure Cr or Cr alloy for improvement of magnetic characteristics. The underlying layer is not limited to a single layer and can be a multilayer constitution in which the same or different layers are stacked. Multi-layered underlying layers such as Al/Cr/CrMo, Al/Cr/Cr, and the like are-exemplified.

A roughness control layer may be formed between the substrate and the magnetic layer or on the magnetic layer to prevent the magnetic head from clinging to the magnetic disc. Formation of the roughness control layer properly controls the surface roughness of the magnetic disc, thereby preventing the magnetic head from clinging to the magnetic disc, and thereby creating a highly reliable magnetic disc. Various materials and methods for forming the roughness control layer have been known and are not particularly limited. For example, as materials for the roughness control layer, exemplified are one or more metals chosen from Al, Ag, Ti, Nb, Ta, Bi, Si, Zr, Cr, Cu, Au, Sn, Pd, Sb, Ge, Mg, and the like, and alloy of those metals, and oxides, nitrides, carbides, and the like of those metals. From a view to form the roughness control layer readily, a metal having aluminum as a main component such as pure Al, Al alloy, aluminum oxide, or aluminum nitride is preferable. For good head positional stability, it is preferred that the surface roughness of the roughness control layer is 50 to 300 angstroms as Rmax. More preferably, the Rmax is 100 to 200 angstroms. When the Rmax is less than 50 angstroms, since the disc surface is nearly flat, the magnetic head and the magnetic disc may cling to each other, thereby likely creating unfavorable results such as damaging the magnetic head or the magnetic disc, or even causing a head clash. On the other hand, when the Rmax exceeds 300 angstroms, a glide height may be too large, thereby causing unfavorable impairments of recording density. A suitable roughness may be given without forming a roughness control layer by a texturing treatment where uneven surface is formed on a glass substrate by means of etching or radiation of laser beam.

As a protective layer, for example, a chromium film, a chromium alloy film, a carbon film, a zirconia layer, a silica layer, and the like are exemplified. Those protective films can be successively formed by an inline sputtering apparatus together with the underlying layer, the magnetic layer, and the like. Those protective layers can be a single film or a multilayer constitution made of the same or different films. Other protective layer or layers may be formed on or in lieu of the protective layer. For example, a silicon oxide ($SiO_2$) film may be formed on the protective layer by applying tetraalkoxysilane diluted in an alcoholic solvent in which colloidal silica fine particles are further dispersed and sintering the applied layer. In this case, the film serves as the protective layer and the roughness control layer.

While various kinds of layers have been proposed as the lubricating layer, the lubricating layer is generally formed by applying perfluoropolyether as a liquid lubricating agent upon diluted in a solvent of fluorocarbon or the like by dipping, spin-coating, or spraying on the media surface and subjecting the coated layer to a heat treatment as needed.

The invention also provides a manufacturing method for the invented magnetic disc described above. With this manufacturing method, after at least a magnetic layer is formed on the substrate of the invention, the substrate is subject to a heat treatment implemented at a temperature lower than the glass transition temperature of the substrate. Under the heat treatment of this condition, the substrate can avoid deforming and enhance the coercive force of the magnetic layer. The heat treatment temperature is set preferably at a temperature 40 degrees Celsius below the transition temperature of the substrate and, more preferably, at a temperature 60 degrees Celsius below the transition temperature, thereby keeping the substrate away from affected by heat.

For example, in the case where a magnetic disc is formed with a substrate made of a conventional chemically tempered glass, the glass temperature is at most around 500 degrees Celsius, and therefore, the heat treatment is done merely at 300 to 400 degrees Celsius. To the contrary, use of the invented substrate allows a heat treatment implemented at about 500 to 800 degrees Celsius.

EXAMPLES

This invention will be more specifically described as follows, based on Examples.

Manufacturing Method for Glass Substrate for Hard Disc

This invention will be described in details based on Examples.

Examples 1 to 32

As a starting material, $SiO_2$, $Al_2O_3$, $Al(OH)_3$, $MgO$, $CaCO_3$, $Y_2O_3$, $TiO_2$, $ZrO_2$, $Li_2O$ and the like were weighed in prescribed ratios into 250 to 300 grams portions, mixed sufficiently to form formulated batches, put in a platinum crucible, and melted to form glass in air for 3 to 5 hours at 1550 degrees Celsius. After melting, the glass melting liquid was cast into a predetermined carbon mold, left to cool down to the glass transition temperature, then, immediately put in an anneal furnace to be annealed for about one hour in a range of the glass transition temperature, and cooled down to the room temperature in the furnace. The obtained glass did not show any crystal observable with a microscope.

The obtained glass samples were sliced into a disc shape, and substrates for magnetic were formed by polishing the major surfaces with cerium oxide. Tables 1 to 5 show compositions of the obtained magnetic discs, transition temperature, and measured results of surface roughness (Ra). Table 1 shows data of $SiO_2$—$Al_2O_3$—MgO—CaO system glass; Table 2 shows data of $SiO_2$—$Al_2O_3$—MgO—$Y_2O_3$ system glass, Table 3 shows data of $SiO_2$—$Al_2O_3$—CaO—$Y_2O_3$ system glass; Table 4 shows data of $SiO_2$—$Al_2O_3$—MgO—CaO—$Y_2O_3$ system glass; and Table 5 shows data of $SiO_2$—$Al_2O_3$—$M_2O_3$ (M denotes trivalent metal.) system glass.

TABLE 1

$SiO_2$—$Al_2O_3$—MgO—CaO system glass
(molar percent)

| Example | 1 | 2 | 3 | 4 | 5 | 6 | 7 | 8 |
|---|---|---|---|---|---|---|---|---|
| $SiO_2$ | 50.00 | 49.00 | 45.00 | 45.00 | 43.00 | 38.00 | 36.50 | 44.00 |
| $Al_2O_3$ | 15.00 | 21.00 | 20.00 | 25.00 | 25.00 | 32.00 | 33.00 | 17.00 |
| MgO | 15.00 | 25.00 | 25.00 | 15.00 | 15.00 | 5.00 | 10.00 | 20.00 |
| CaO | 20.00 | 5.00 | 10.00 | 10.00 | 10.00 | 21.00 | 16.00 | 17.00 |
| $Y_2O_3$ | | | | | | 3.00 | 4.00 | |
| $TiO_2$ | | | | 5.00 | 5.00 | 2.00 | 2.00 | |
| $ZrO_2$ | | | | | 2.00 | | | |
| $Li_2O$ | | | | | | 2.00 | 2.50 | |
| Others | | | | | | $As_2O_3$ 0.3 | $Cr_2O_3$ 2.00 | |
| Surface Roughness Ra (Å) | 4 | 3 | 4 | 4 | 4 | 4 | 4 | 5 |
| Transition Temperature (° C.) | 753 | 778 | 769 | 775 | 767 | 782 | 771 | 769 |

TABLE 2

$SiO_2$—$Al_2O_3$—MgO—$Y_2O_3$ system glass
(molar percent)

| Example | 9 | 10 | 11 | 12 | 13 | 14 | 15 |
|---|---|---|---|---|---|---|---|
| $SiO_2$ | 48.00 | 45.00 | 41.00 | 40.00 | 40.00 | 45.00 | 44.00 |
| $Al_2O_3$ | 22.00 | 25.00 | 27.00 | 32.00 | 25.00 | 25.00 | 27.00 |
| MgO | 30.00 | 22.00 | 20.00 | 17.00 | 25.00 | 23.00 | 23.00 |
| CaO | | | | | | | |
| $Y_2O_3$ | | 1.00 | 4.00 | 8.00 | 5.00 | 3.00 | 4.00 |
| $TiO_2$ | | 7.00 | 8.00 | 3.00 | | 2.00 | 2.00 |
| $ZrO_2$ | | | | | 5.00 | 2.00 | |
| $Li_2O$ | | | | | | | |
| Others | | | | | | $As_2O_3$ 0.5 | $V_2O_5$ 2.0 |
| Surface Roughness Ra (Å) | 4 | 3 | 4 | 4 | 5 | 4 | 4 |
| Transition Temperature (° C.) | 771 | 769 | 778 | 802 | 779 | 791 | 787 |

TABLE 3

$SiO_2$—$Al_2O_3$—CaO—$Y_2O_3$ system glass
(molar percent)

| Example | 16 | 17 | 18 | 19 | 20 | 21 |
|---|---|---|---|---|---|---|
| $SiO_2$ | 40.00 | 35.00 | 38.00 | 36.50 | 38.00 | 37.00 |
| $Al_2O_3$ | 32.00 | 33.00 | 35.00 | 33.00 | 32.00 | 35.00 |
| MgO | | | | | | |
| CaO | 20.00 | 25.00 | 19.00 | 22.00 | 23.00 | 20.00 |
| $Y_2O_3$ | 8.00 | 5.00 | 5.00 | 4.00 | 3.00 | 5.00 |
| $TiO_2$ | | 2.00 | | 2.00 | 2.00 | 2.50 |
| $ZrO_2$ | | | 3.00 | | | 2.50 |
| $Li_2O$ | | | | 2.50 | 2.00 | |
| Others | | | | | | $Sb_2O_3$ 0.5 |
| Surface Roughness Ra (Å) | 4 | 4 | 5 | 4 | 4 | 4 |
| Transition Temperature (° C.) | 844 | 828 | 836 | 771 | 782 | 782 |

TABLE 4

$SiO_2$—$Al_2O_3$—MgO—CaO—$Y_2O_3$ system glass
(molar percent)

| Example | 22 | 23 | 24 | 25 | 26 | 27 |
|---|---|---|---|---|---|---|
| $SiO_2$ | 45.00 | 35.00 | 45.00 | 45.00 | 41.50 | 42.50 |
| $Al_2O_3$ | 12.50 | 33.00 | 7.50 | 25.00 | 25.00 | 27.00 |
| MgO | 30.00 | 7.00 | 30.00 | 20.00 | 20.00 | 17.00 |
| CaO | 5.00 | 18.00 | 5.00 | 3.00 | 5.00 | 5.00 |
| $Y_2O_3$ | 7.50 | 5.00 | 7.50 | 3.00 | 3.00 | 4.00 |
| $TiO_2$ | | 2.00 | | 2.00 | 5.00 | 4.00 |
| $ZrO_2$ | | | 5.00 | 2.00 | | |
| $Li_2O$ | | | | | | |
| Others | | | | | $Sb_2O_3$ 0.5 | $As_2O_5$ 0.5 |
| Surface Roughness Ra (Å) | 4 | 4 | 5 | 4 | 4 | 4 |
| Transition Temperature (° C.) | 757 | 803 | 764 | 795 | 770 | 788 |

TABLE 5

$SiO_2$—$Al_2O_3$—MO (M: trivalent metal) system glass
(molar percent)

| Example | 28 | 29 | 30 | 31 | 32 |
|---|---|---|---|---|---|
| $SiO_2$ | 55.00 | 50.00 | 50.00 | 50.00 | 43.20 |
| $Al_2O_3$ | 22.70 | 28.00 | 28.00 | 28.00 | 25.40 |
| $Y_2O_3$ | 22.30 | | | | |
| $Nd_2O_3$ | | 20.00 | | | |
| $Gd_2O_3$ | | | 20.00 | | |
| $Ho_2O_3$ | | | | 20.00 | |
| $La_2O_2$ | | | | | 18.40 |
| $TiO_2$ | | 2.00 | 2.00 | 2.00 | 13.00 |
| $ZrO_2$ | | | | | |
| $Li_2O$ | | | | | |
| Others | | | | | |
| Surface Roughness Ra (Å) | 6 | 5 | 5 | 5 | 5 |
| Transition Temperature (° C.) | 848 | 873 | 882 | 890 | 842 |

Comparative Examples 1 & 2

For a purpose of comparison, compositions and characteristics of the ion exchanged, chemically tempered glass substrate (Comparative Example 1) described in Japanese Unexamined Patent Publication No. Hei 1-239,036 (Reference 1) and the crystallized glass substrate (Comparative Example 2) described in Japanese Unexamined Patent Publication No. Hei 7-197,711 (Reference 2) are shown in Table 6.

TABLE 6

| Comparative Example | (molar percent) | |
|---|---|---|
| | 1 | 2 |
| $SiO_2$ | 73.00 | 52.00 |
| $Al_2O_3$ | 6.0 | 1.0 |
| CaO | 7.0 | 16.0 |
| $Na_2O$ | 9.0 | 7.0 |
| $K_2O$ | 9.0 | 5.0 |
| Others | ZnO: 2.0 | F: 19.0 |
| | $As_2O_3$: 0.2 | |
| Surface Roughness Ra (Å) | 12 | 25 |
| Transition Temperature (° C.) | 554 | — |

As apparent from Tables 1 to 5, glasses of Examples 1 to 32 have transition temperatures of 750 degrees Celsius or greater and have excellent heat resistance. The surface roughness is of 5 angstroms or less, and since the glasses have excellent flatness, the glasses can facilitate higher density recordings and are useful for substrates for magnetic discs. The glasses of those Examples are alkali-free or rarely contain alkali, so that the glasses have an advantage that alkali ions in the glasses will not be diffused in a thin film formed on each substrate to change the properties of the film.

To the contrary, the chemically tempered glass substrate of Comparative Example 1, though having an excellent flatness, has a very poor heat resistance in comparison with the substrate of the invention. Thus, when a magnetic disc is manufactured, a high temperature heat treatment (e.g., at 500 degrees Celsius or greater) cannot be given to a magnetic layer to get a higher coercive force, so that a magnetic disc having a higher coercive force may not be produced.

The crystallized glass substrate of Comparative Example 2, though having an excellent heat resistance because of having no transition temperature, has very poor flatness in comparison with the substrate of the invention, and therefore, cannot contribute to a high density recording.

Manufacturing Method for Hard Disc

As shown in FIG. 1, the magnetic disc 1 according to the invention is formed of, on the glass substrate 2 of Example 16, a roughness control layer 3, an underlying layer 4, a magnetic layer 5, a protective layer 6, and a lubricating layer 7 in this order.

More specifically, the substrate 1 was fabricated to be in a disc shape having an outer circle diameter of 65 millimeters, a center portion hole diameter of 20 millimeters, and a thickness of 0.381 millimeter. The substrate 1 was precisely polished to render the surface roughness of both major surfaces Ra=4 angstroms and Rmax=40 angstroms. The roughness control layer is an AlN thin film having an average roughness of 50 angstroms, a surface roughness Rmax of 150 angstroms, and a nitrogen content of 5 to 35 percent. The underlying layer is a CrV thin film having a thickness of about 600 angstroms whose compositional ratio is that Cr is 83 atomic percent and V is 17 atomic percent. The magnetic layer is a CoPtCr thin film having a thickness of about 300 angstroms whose compositional ratio is that Co is 76 atomic percent and Pt is 6.6 atomic percent and Cr is 17.4 atomic percent. The protective layer is a carbon thin film having a thickness of about 100 angstroms. The lubricating layer is formed with a thickness of 8 angstroms by spin-coating a lubricating agent constituted of perfluoropolyether on the carbon protective layer.

The manufacturing method for the magnetic disc according to an embodiment of the invention is now described. First, the glass produced in the Example is formed into a disc shape having an outer circle diameter of 65 millimeters, a hole diameter of 20 millimeters, and a thickness of 0.381 millimeter by grinding or lapping, thereby creating a glass substrate for magnetic disc by precisely polishing both major surfaces of the substrate as to render the surface roughness Ra=4 angstroms and Rmax=40 angstroms. After set into a substrate holder, the glass substrate is fed into a charging chamber of an inline sputtering apparatus. The holder on which the glass substrate was set is fed into a first chamber in which an Al target was etched, and the Al target is then subject to sputtering at a pressure of 4 millitorrs, a substrate temperature of 350 degrees Celsius, in an atmosphere of Ar+$N_2$ gas ($N_2$=4 percent). As a result, an AlN thin film (roughness control layer) having a surface roughness Rmax of 150 angstroms and a film thickness of 50 angstroms was formed on the glass substrate.

The holder on which the glass substrate formed with the AlN film is set is transferred to a second chamber in which a CrV target (Cr: 83 atomic percent, V: 17 atomic percent) is installed and then to a third chamber in which a CoPtCt target (Co: 76 atomic percent, Pt: 6.6 atomic percent, Cr: 17.4 atomic percent) is installed, and films are formed on the substrate. By sputtering at a pressure of 2 millitorrs, a substrate temperature of 350 degrees Celsius, in an atmosphere of Ar, formed are films of a CrV underlying layer of a thickness of about 600 angstroms and of a CoPtCr magnetic layer of a thickness of about 300 angstroms.

The substrate on which the roughness control layer, the underlying layer, and the magnetic layer are formed is transferred into a fourth chamber in which a heater is installed to perform a heat treatment. The heat treatment is conducted by rendering the fourth chamber in an Ar gas atmosphere (pressure of 2 millitorrs) and changing the temperature of the heat treatment from 400 to 800 degrees Celsius as shown in Table 7.

The substrate is then transferred into a fifth chamber in which a carbon target is installed, and a carbon protective layer having a thickness of about 100 angstroms is formed under the same film forming condition as that for forming the CrV underlying layer and the CoPtCr magnetic layer except an atmosphere of Ar+$H_2$ gas ($H_2$=6 percent).

Finally, the substrate completed up to formation of the carbon protective layer is taken out of the inline sputter apparatus. Perfluoropolyether is coated on the surface of the carbon protective layer by a dipping method to form a lubricating layer of a thickness of 8 angstroms, thereby forming the magnetic disc.

Table 7 shows a relation between heat treatment temperature and coercive force. Examples 33 to 37 indicate data where the glass having composition of Example 16 shown in Table 3 was used as a substrate; Comparative Example 3 indicates data where the chemically tempered glass of Comparative Example 1 shown in Table 6 was used as a substrate.

TABLE 7

| Examples | 33 | 34 | 35 | 36 | 37 | Comparative Example 3 |
|---|---|---|---|---|---|---|
| Heat Treatment Temperature (° C.) | 400 | 500 | 600 | 700 | 800 | 300 |

TABLE 7-continued

| Examples | 33 | 34 | 35 | 36 | 37 | Comparative Example 3 |
|---|---|---|---|---|---|---|
| Coercive Force (Oe) | 2050 | 2300 | 2400 | 2600 | 2800 | 1800 |

As apparent from Table 7, the magnetic disc can have a higher coercive force by the heat treatment of 400 to 800 degrees Celsius in use of the glass substrate of the invention, in comparison with a magnetic disc using a conventional, chemically tempered glass substrate which compels a heat treatment done at a lower temperature. Regarding a relation between a magnetic disc and a magnetic head in Examples 33 to 37, a kinematic friction coefficient was 0.2 while a static friction coefficient was 0.25. No problem was found upon implementing a CSS (contact start and stop) durability test (100,000 turns), and the glide height was 0.15 micrometer or less at that time. Therefore, we convinced that a highly reliable magnetic disc with a higher recording density was surely produced.

Although preferred embodiments are exemplified to describe the invention, this invention is not limited to the embodiments above. For example, the magnetic layer can be thermally treated after the protective layer is formed where a heater is provided in the fifth chamber for forming the protective layer. The same effect can be obtained if the atmosphere for the heat treatment is in a range of 1 millitorr to atmospheric pressure.

As described above, the invention provides a substrate for information recording media having excellent heat resistance and flatness and being made stronger than a carbon substrate, by use of a glass whose transition temperature is 750 degrees Celsius or greater as a substrate for information recording media. According to the manufacturing method for magnetic discs of the invention, the substrate having such an excellent heat resistance can be thermally treated at a high temperature, which is required for improving magnetic characteristics of the magnetic layer, thereby maximizing improvements of characteristics of the magnetic layer.

What is claimed is:

1. A substrate for information recording media comprising a material comprising a glass having a transition temperature of 750 degrees Celsius or greater.

2. The substrate according to claim 1, wherein the substrate has a high surface smoothness.

3. The substrate according to claim 1, wherein the information recording media are magnetic discs.

4. The substrate according to claim 1, wherein the glass comprises a component selected from the group consisting of $SiO_2$—$Al_2O_3$—$MgO$—$CaO$, $SiO_2$—$Al_2O_3$—$MgO$—$Y_2O_3$, $SiO_2$—$Al_2O_3$—$CaO$—$Y_2O_3$, $SiO_2$—$Al_2O_3$—$MgO$—$CaO$—$Y_2O_3$, and $SiO_2$—$Al_2O_3$—$M_2O_3$, wherein M denotes a trivalent metal.

5. The substrate according to claim 4, wherein the substrate has a high surface smoothness.

6. The substrate according to claim 4, wherein the information recording media are magnetic discs.

7. A magnetic disc having at least a magnetic layer on a substrate according to claim 4.

8. A magnetic disc having at least a magnetic layer on a substrate according to claim 7.

9. The magnetic according to claim 8, wherein the magnetic layer is a magnetic layer with a coercive force improved by heat treatment.

10. A manufacturing method for magnetic disc comprising the steps of forming a magnetic layer on a substrate as set forth in claim 1, and thermally treating the magnetic layer at a temperature at least 40 degrees Celsius below the transition temperature of the material forming the substrate to improve a coercive force of the magnetic layer.

11. A manufacturing method for magnetic disc comprising the steps of forming a magnetic layer on a substrate as set forth in claim 4, and thermally treating the magnetic layer at a temperature at least 40 degrees Celsius below the transition temperature of the material forming the substrate to improve a coercive force of the magnetic layer.

* * * * *